US006979405B2

(12) United States Patent
Weir

(10) Patent No.: US 6,979,405 B2
(45) Date of Patent: Dec. 27, 2005

(54) FLOCCULATION OF MINERAL SUSPENSIONS

(75) Inventor: Steven Weir, Huddersfield (GB)

(73) Assignee: Ciba Specialty Chemicals Water Treatments, Ltd., Bradford (GB)

( * ) Notice: Subject to any disclaimer, the term of this patent is extended or adjusted under 35 U.S.C. 154(b) by 45 days.

(21) Appl. No.: 10/432,300

(22) PCT Filed: Nov. 16, 2001

(86) PCT No.: PCT/EP01/13272

§ 371 (c)(1),
(2), (4) Date: May 21, 2003

(87) PCT Pub. No.: WO02/44093

PCT Pub. Date: Jun. 6, 2002

(65) Prior Publication Data

US 2004/0035800 A1    Feb. 26, 2004

(30) Foreign Application Priority Data

Nov. 29, 2000 (GB) .................................. 0029077

(51) Int. Cl.[7] ................................................. C02F 1/56
(52) U.S. Cl. ........................ 210/727; 209/5; 210/732; 210/734; 210/907; 423/122; 501/148
(58) Field of Search .......................... 209/5; 210/725, 210/727, 732, 733, 734, 907; 501/148; 423/122

(56) References Cited

U.S. PATENT DOCUMENTS 3,578,586 A * 5/1971 Gal et al. .................. 210/710
4,127,482 A * 11/1978 Watson et al. ............. 210/727
4,251,363 A * 2/1981 Chamberlain et al. ...... 210/727
4,342,653 A * 8/1982 Halverson ................. 210/734
4,515,696 A * 5/1985 Matthew et al. ........... 210/713
4,670,158 A * 6/1987 Kelly ........................ 210/705
4,690,752 A * 9/1987 Shaw ............................ 209/5
4,816,166 A * 3/1989 Cawiezel .................... 210/727
4,931,190 A * 6/1990 Laros ......................... 210/710

FOREIGN PATENT DOCUMENTS

| EP | 0017353 | * 10/1980 |
| EP | 0555489 | * 7/1982 |
| GB | 2003127 | * 3/1979 |
| GB | 2080272 | * 2/1982 |
| GB | 2148938 | * 6/1985 |

OTHER PUBLICATIONS

Derwent Abstr. 1986-218015 for SU 1204576 (1986).*
Patent Abstracts of Japan Publication No. 04050209 (1992).*

* cited by examiner

Primary Examiner—Peter A. Hruskoci
(74) Attorney, Agent, or Firm—Shiela A. Loggins

(57) ABSTRACT

A method of dewatering an aqueous mineral suspension comprising introducing into the suspension a flocculating system comprising, a) a substantially non-ionic polymeric flocculant and b) an anionic polymeric flocculant, characterised in that, the substantially non-ionic polymeric flocculant is added to the suspension before the addition of the anionic polymeric flocculant. The method is useful for flocculating China clay suspensions, suspensions of s welling clays, calcium carbonate suspensions, titanium dioxide suspensions, suspensions of coal tailings, red mud and phosphate slimes etc.

7 Claims, 4 Drawing Sheets

FLOCCULATION OF MINERAL SUSPENSIONS

Figure 1:
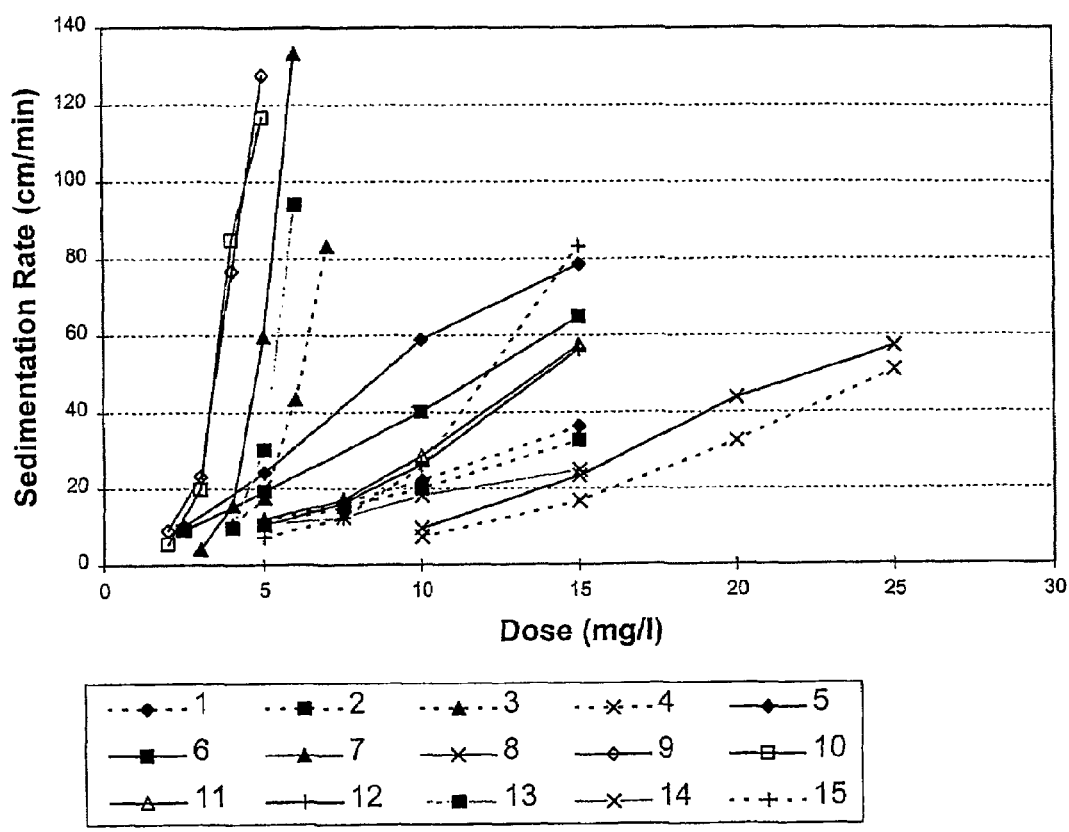

The present invention concerns an improved method of flocculating mineral suspensions.

Anionic flocculants are widely used for flocculating mineral suspensions. The flocculated suspensions are often dewatered by sedimentation. Flocculants generally used, include polymers of sodium acrylate and also sulphonate polymers is known (e.g. U.S. Pat. No. 4,342,653 and U.S. Pat. No. 4,704,209).

High molecular weight copolymers of ethylenically unsaturated dibasic carboxylic acids are known for use as coagulants or flocculants. For instance CN-A-1032925 describes the use of an acrylamide/maleic anhydride copolymer as a coagulant to assist the multi-stage flocculation process for washing hydrated titanium dioxide.

U.S. Pat. No. 4,678,585 describes flocculating red mud suspensions in the Bayer alumina process using homopolymers of acrylic acid or sodium acrylate or copolymers of acrylic acid or acrylate with acrylamide.

U.S. Pat. No. 4,224,149 describes the use of an effective amount of a precipitant or sequestrant for calcium ions for improving the performance of anionic polymeric carboxylic acid flocculants in flocculating phosphate slimes.

U.S. Pat. No. 4,251,363 describes the flocculation of phosphate slimes and addresses the need for a flocculation process that involves reducing the dosage of flocculants and thus the treatment costs. A process is proposed which comprises adding to the slimes a first acrylamide/acrylic acid copolymer flocculant having a molecular weight of about 50,000 to 500,000 and then a second high molecular weight acrylamide/acrylic acid copolymer flocculant having a molecular weight of at least about 2,000,000.

Nonionic flocculants have been used for a variety of dewatering applications including papermaking, for instance as described in EP-A-17353 in which a substantially non-ionic polymer is applied to a paper making furnish followed by a swellable bentonite clay.

Non-ionic polymers have been used in various other flocculation applications. For instance in U.S. Pat. No. 4,690,752 a process for separating and recovering non-metallic minerals, particularly phosphate, in which the ore is slurried in an alkaline, aqueous solution with dispersing agent. A flotation collector is added, and the mixture is contacted with a hydrophobic, high molecular weight non-ionic flocculant to flocculate the fine particles and then make them amenable to subsequent flotation. This patent also proposes separately a second process for recovering a phosphorus ore upgraded by at least about 5% phosphate content from phosphate slime by use of a high molecular weight anionic polyacrylamide Despite the various attempts to find improved methods of dewatering mineral suspensions in general, there still exists a need for further increases in flocculant dose efficiency.

According to the present invention we provide a method of dewatering an aqueous mineral suspension comprising introducing into the suspension a flocculating system comprising, a) a substantially non-ionic polymeric flocculant and
b) an anionic polymeric flocculant,
characterised in that,
the substantially non-ionic polymeric flocculant is added to the suspension before the addition of the anionic polymeric flocculant.

The substantially non-ionic polymer may be slightly ionic, for instance comprising no more than 10 mole % ionic repeating units. Thus the polymer may contain up to 10 mole % anionic groups or up to 10 mole % cationic groups. It may also be desirable for the substantially non-ionic polymer to comprise both anionic and cationic groups provided that the effective ionic charge is less than 10 mole %. When the substantially non-ionic polymer does comprise ionic groups, it may be as a result of copolymerising a non-ionic monomer with low amounts of ionic monomer, for instance up to 10 mole %. Alternatively the polymer may prepared using a non-ionic monomer that is capable of being converted into an ionic monomer. In this instance a non-ionic monomer may polymerised and either during the polymerisation process or subsequently up to 10 mole % of the non-ionic monomer units would be converted into ionic groups. For instance the nonionic monomer may be acrylamide up to 10 mole % of the acrylamide repeating units may be hydrolysed to acrylic acid units.

Although the substantially non-ionic polymer can be slightly ionic it is preferred that the ionic content is below 5%. More preferably the polymer is wholly non-ionic or contains no more than 2 mole % anionic repeating units.

The non-ionic polymer is desirably prepared from non-ionic water soluble ethylenically unsaturated monomers. By water soluble we mean that the monomer has a solubility of at least 5 g/100 ml at 25° C. Such polymers may be prepared by any of the standard industrial processes for making polymers, for instance by solution polymerisation, reverse phase suspension polymerisation or reverse phase emulsion polymerisation. The non-ionic polymer thus may be provided in the form of beads, powder or emulsions. Typically the non-ionic polymer is selected from the group consisting of polymers of acrylamide, polyvinyl pyrrolidone and polyethylene oxide.

The non-ionic polymers are generally of relatively high molecular weight, for instance above 500,000. Desirably the molecular weight is in excess of 1,000,000 and typically several million, for instance at least 6,000,000 or 7,000,000 and preferably at least 10,000,000 or 12,000,000 or higher. Alternatively the non-ionic polymer may be characterised in terms of intrinsic viscosity, for instance the polymers would exhibit an intrinsic viscosity of at least 3 dl/g and usually at least 4 of 5 dl/g. Preferably the polymers exhibit intrinsic viscosities of at least 7 or 8 dl/g and may be even as high as 30 dl/g or higher. Typically the non-ionic polymers have intrinsic viscosities in the range 11 or 12 dl/g to 19 or 20 dl/g for instance around 15 or 16 dl/g. Intrinsic viscosity is measured using a suspended level viscometer in 1M NaCl buffered to pH 7.5 at 25° C.

The anionic polymer may be wholly anionic or it may contain both anionic and non-ionic repeating units. The anionic polymer must always exhibit higher anionicity than the non-ionic polymer. Generally the anionic polymer comprises greater than 10 mole % anionic repeating units. In some applications the anionic polymer may comprises 50 to 100 mole % anionic repeating units, it may be desirable in other applications for the anionic polymer to comprise at least 15 mole % and up to 50 mole % anionic repeating units, for instance greater tan 20 and up to 30 or 40 mole % anionic repeating units.

The anionic polymer is desirably prepared from at least one anionic water soluble ethylenically unsaturated monomer, optionally with at least one non-ionic monomer. By water soluble we mean that the monomer has a solubility of at least 5 g/100 ml at 25° C. Such polymers may be prepared by any of the standard industrial processes for making polymers, for instance by solution polymerisation, reverse phase suspension polymerisation or reverse phase emulsion polymerisation. The anionic polymer thus may be provided in the form of beads, powder or emulsions.

Typically the anionic polymer is selected from the group consisting of polymers of ethylenically unsaturated carboxylic acid or sulphonic acid, for instance acrylic acid, maleic acid, itaconic acid or alkali metal salts thereof. Alternatively the anionic polymer may be formed from potentially anionic monomers, for instance maleic anhydride. Typically the anionic polymer is selected from copolymers comprising acrylamide with monomers selected from (meth)acrylic acid or 2-acrylamido-2-methylpropane sulphonic acid and salts thereof.

Preferably the anionic polymer is selected from copolymers comprising acrylamide with monomers selected from (meth)acrylic acid or 2-acrylamido-2-methylpropane sulphonic acid and salts thereof.

The present invention provides significant advantages in dose efficiency in dewatering various mineral suspensions. By mineral suspension we mean suspensions in which the weight of suspended solids is substantially mineral. Generally the solids in suspension are at least 50 or 60% mineral by total weight of suspended solids. Often the suspended solids are at least 80%, and preferably at least 90% by weight mineral solids. More preferably the suspended solids in the mineral suspension are virtually all mineral and contain less than 2% none mineral solids, especially less than 1% mineral solids. In some instances the suspended solids are wholly mineral. Typically the method is applicable to dewatering mineral suspensions selected from China clay suspensions, suspensions of swelling clays, calcium carbonate suspensions, titanium dioxide suspensions, suspensions of coal tailings, red mud and phosphate slimes.

We have surprisingly found that the method of the present invention improvements in rate of sedimentation and flocculant dose efficiency. It is important to achieve these improvements that the non-ionic polymeric flocculant is combined with the mineral suspension before the addition of the anionic polymeric flocculant. Generally the non-ionic flocculant and anionic flocculants are added to the suspension as aqueous solutions. Alternatively it may be desirable for the non-ionic and/or anionic polymers to be added in an alternative form, for instance by adding dry particles or a dispersion of particles to the mineral suspension. Once the non-ionic flocculant has been added, it is preferred that flocculation of the suspended mineral solids has commenced before the anionic flocculant is added.

The method of the present invention may be part of a multicomponent flocculation system in which additional flocculants and/or coagulants are used in combination with the non-ionic and anionic flocculants of the present invention. However, it is preferred that the flocculants of the present invention are the only flocculants added to the mineral suspension.

The non-ionic polymeric flocculant may be added at any stage before the introduction of the non-ionic flocculant. However, it is preferred that the non-ionic polymer has been allowed to distribute at least partially before the anionic polymer is added. More preferably the non-ionic polymer has been mixed with the suspension such that it is distributed throughout it and that flocculation has commenced before the anionic polymer is introduced.

Desirably the non-ionic and anionic flocculants may be added to mineral suspension which is flowing towards a thickener or sedimentation vessel. Thus in one way of carrying out the invention the non-ionic flocculant is dosed into the a feed line conveying the mineral suspension into a thickening stage. Flocculation commences upon addition of the non-ionic flocculant to the suspension. The anionic flocculant may then be added into the flow line. The flocculating suspension then enters the sedimentation vessel and dewatered to form an underflow of sedimented solids and a clear aqueous supernatent layer.

Alternatively the anionic flocculant may be added directly to the mineral suspension in the sedimentation vessel.

The ratio of nonionic polymeric flocculant to anionic polymer flocculant may be between 90:10 to 10:90 by weight. Typically though the proportion of non-ionic polymer to anionic polymer is between 75:25 to 25:75. It is preferred though that the non-ionic flocculant is between 25 and about 50% by weight of total flocculant. More preferably the non-ionic and anionic polymer flocculants are added in approximately equal amounts.

The following examples illustrate the benefits of the method.

FIGS. 1–4 show plotted results of the Examples

EXAMPLE 1

Tests 1 to 4

An 0.05% by weight aqueous solution of a Polymer is introduced at various doses into 500 ml of a 4% by weight aqueous China clay suspension in a 1 liter beaker and mixed at 1,000 rpm for 15 seconds using a lab mixer with 3 blade marine type impeller with approximately 3.5 cm radius sweep, positioned 1 cm from the base of the beaker. The flocculated material transferred immediately to 500 ml measuring cylinder. The sedimentation rate is determined by observing a mud line formed and time taken for the mud line to pass between a depth of 3 cm and 8 cm from the top of the suspension. The sedimentation rate (cm/min) is measured for each dose of polymer and the results are shown in table 1.

Test 1: Polymer A—non-ionic polyacrylamide of intrinsic viscosity 20 dl/g

Test 2: Polymer B—non-ionic polyacrylamide of intrinsic viscosity 15 dl/g

Test 3: polymer C—sodium acrylate/acrylamide copolymer (22/68 wt./wt.) of intrinsic viscosity 24 dl/g Test 4: Polymer D—dimethylaminoethyl acrylate, methyl chloride quaternary ammonium salt copolymer with acrylamide (60/40 wt./wt.) of intrinsic viscosity 14 dl/g Tests 5 to 17

Test 1 is repeated, except a first flocculant is added at various doses into 4% by weight aqueous China clay suspension and mixed at 1,000 rpm for 5 seconds followed by addition of a second flocculant and then mixed at 1,000 for 15 seconds. For each total flocculant dose, the first and second flocculants are added in equal proportions by weight. The sedimentation rate (cm/min) is measured for each total dose of flocculant and the results are shown in table 1.

Test 5: Polymer A followed by Polymer A

Test 6: Polymer B followed by Polymer B

Test 7: Polymer C followed by Polymer C

Test 8: Polymer D followed by Polymer D

Test 9: Polymer A followed by Polymer C [Invention]

Test 10: Polymer B followed by Polymer C [Invention]

Test 11: Polymer A followed by Polymer D

Test 12: Polymer B followed by Polymer D

Test 13: Polymer D followed by Polymer C

Test 14: Polymer D followed by Polymer B

Test 15: Polymer C followed by Polymer D

TABLE 1

| Dose Mg/l | Test No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 2.0 | | | | | | | | | 9.1 | 5.4 | | | | | |
| 2.5 | | | | | 10.2 | 9.1 | | | | | | | | | |
| 3.0 | | | | | | | 4.2 | | 23.2 | 19.9 | | | | | |
| 4.0 | | | 10.7 | | | | 15.7 | | 76.7 | 85.0 | | | 9.8 | | |
| 5.0 | 11.5 | 10.5 | 17.7 | | 24.1 | 19.3 | 59.6 | | 127.7 | 116.7 | 12.0 | 10.3 | 30.1 | 10.4 | 7.2 |
| 6.0 | | | 43.4 | | | | 133.3 | | | | | | 94.0 | | |
| 7.0 | | | 83.3 | | | | | | | | | | | | |
| 7.5 | 16.3 | 15.3 | | | | | | | | | 17.1 | 16.4 | | 12.5 | 12.4 |
| 8.0 | | | | | | | | | | | | | | | |
| 10.0 | 22.1 | 20.0 | | 7.4 | 58.9 | 40.2 | | 9.7 | | | 28.6 | 26.3 | | 18.2 | 25.8 |
| 15.0 | 36.2 | 32.6 | | 16.8 | 78.5 | 64.8 | | 23.3 | | | 57.5 | 56.5 | | 24.9 | 83.3 |
| 20.0 | | | | 32.4 | | | | 43.8 | | | | | | | |
| 25.0 | | | | 51.0 | | | | 57.1 | | | | | | | |

The Results are plotted in FIG. 1. It can clearly be seen that the flocculation treatment according to the present method provides improved dose efficiency in order to achieve satisfactory sedimentation rates over single flocculation treatments, even with anionic polymer and other two stage polymer treatments.

EXAMPLE 2

Example 1 is repeated using the different ratios of first and second polymer flocculant.
Polymer A: As defined in example 1
Polymer E:—sodium acrylate/acrylamide copolymer (47/53 wt./wt.) of intrinsic viscosity 24.7 dl/g
Test 1: Polymer A then Polymer E (25/75 wt./wt.)
Test 2: Polymer A then Polymer E (50/50 wt./wt/)
Test 3: Polymer E then Polymer E (25/75 wt./wt.)
Test 4: Polymer E then Polymer E (50/50 wt./wt.)
Test 5: Polymer E then Polymer E (75/25 wt./wt.)
The sedimentation rates cm/min are shown in Table 2

TABLE 2

| Dose Mg/l | Test 1 | Test 2 | Test 3 | Test 4 | Test 5 |
|---|---|---|---|---|---|
| 2 | 9.9 | 20.9 | 4.8 | 5.6 | 4.6 |
| 3 | 51.9 | 54.2 | 14.2 | 17.1 | 11.7 |
| 4 | 97.1 | 101.0 | 61.6 | 89.6 | 54.8 |

Figure 2:
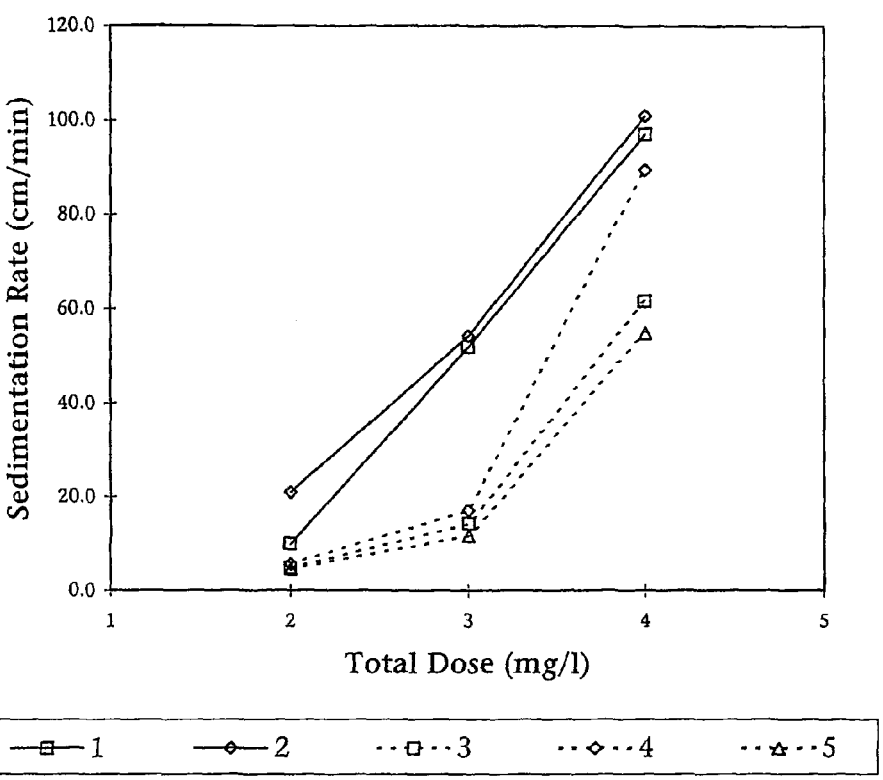

These results are plotted in FIG. 2.
The results clearly demonstrate improvements of using the nonionic/anionic at 25/75 and 50/50 treatments according to the invention over anionic dual treatments at various ratios.

EXAMPLE 3

Example 1 is repeated using a first and second polymer flocculant in which second polymer flocculant of different ionicities is employed.

Polymer A: As defined in example 1
Polymer C: As defined in example 1
Polymer E: As defined in example 2
Polymer F—Sodium acrylate/acrylamide copolymer (4/96 wt./wt.) of intrinsic viscosity 18.2 dl/g
Polymer G—Sodium acrylate/acrylamide copolymer (7/93 wt./wt.) of intrinsic viscosity 19.1 dl/g
Polymer H—Sodium acrylate/acrylamide copolymer (15/85 wt./wt.) of intrinsic viscosity 20.0 dl/g
Polymer I—Sodium acrylate/acrylamide copolymer (30/70 wt./wt.) of intrinsic viscosity 23.7 dl/g
Polymer J—Dimethylaminoethyl acrylate, methyl chloride quaternary ammonium salt copolymer with acrylamide (2/98 wt./wt.) of intrinsic viscosity 14.7 dl/g
Polymer K Dimethylaminoethyl acrylate, methyl chloride quaternary ammonium salt copolymer with acrylamide (5/95 wt./wt.) of intrinsic viscosity 14.0 dl/g
Polymer L Dimethylaminoethyl acrylate, methyl chloride quaternary ammonium salt copolymer with acrylamide (15/85 wt./wt.) of intrinsic viscosity 13.6 dl/g
Polymer M Dimethylaminoethyl acrylate, methyl chloride quaternary ammonium salt copolymer with acrylamide (20/80 wt./wt.) of intrinsic viscosity 15.5 dl/g In All tests the first polymer is Polymer A. The second polymer is as shown against each test.

Test 1: Polymer A; Test 2: Polymer F; Test 3: Polymer G; Test 4: Polymer H; Test 5: Polymer C; Test 6: Polymer I; Test 7: Polymer E; Test 8: Polymer J; Test 9: Polymer K; Test 10: Polymer L; Test 1 1: Polymer M.

The sedimentation rates (cm/min) for each test are shown in table 3. The doses are total polymer dose and the ratio of first polymer to second polymer is 50/50 (weight/weight).

TABLE 3

| Dose mg/l | Test 1 | Test 2 | Test 3 | Test 4 | Test 5 | Test 6 | Test 7 | Test 8 | Test 9 | Test 10 | Test 11 |
|---|---|---|---|---|---|---|---|---|---|---|---|
| 2 | 12.9 | 12.3 | 12.1 | 11.6 | 13.2 | 14.0 | 20.9 | | | | |
| 3 | 17.4 | 22.5 | 24.9 | 27.9 | 37.1 | 58.5 | 54.2 | | | | |

TABLE 3-continued

| Dose mg/l | Test 1 | Test 2 | Test 3 | Test 4 | Test 5 | Test 6 | Test 7 | Test 8 | Test 9 | Test 10 | Test 11 |
|---|---|---|---|---|---|---|---|---|---|---|---|
| 4 | 22.2 | 37.1 | 42.3 | 89.8 | 84.3 | 98.0 | 101.0 | | | | |
| 5 | 29.2 | 62.8 | 64.0 | | | | | | | | |
| 6 | 35.7 | | | | | | | 28.1 | 29.0 | 29.9 | 26.3 |
| 7 | 38.7 | | | | | | | 35.3 | 34.3 | 36.5 | 34.0 |

Figure 3:
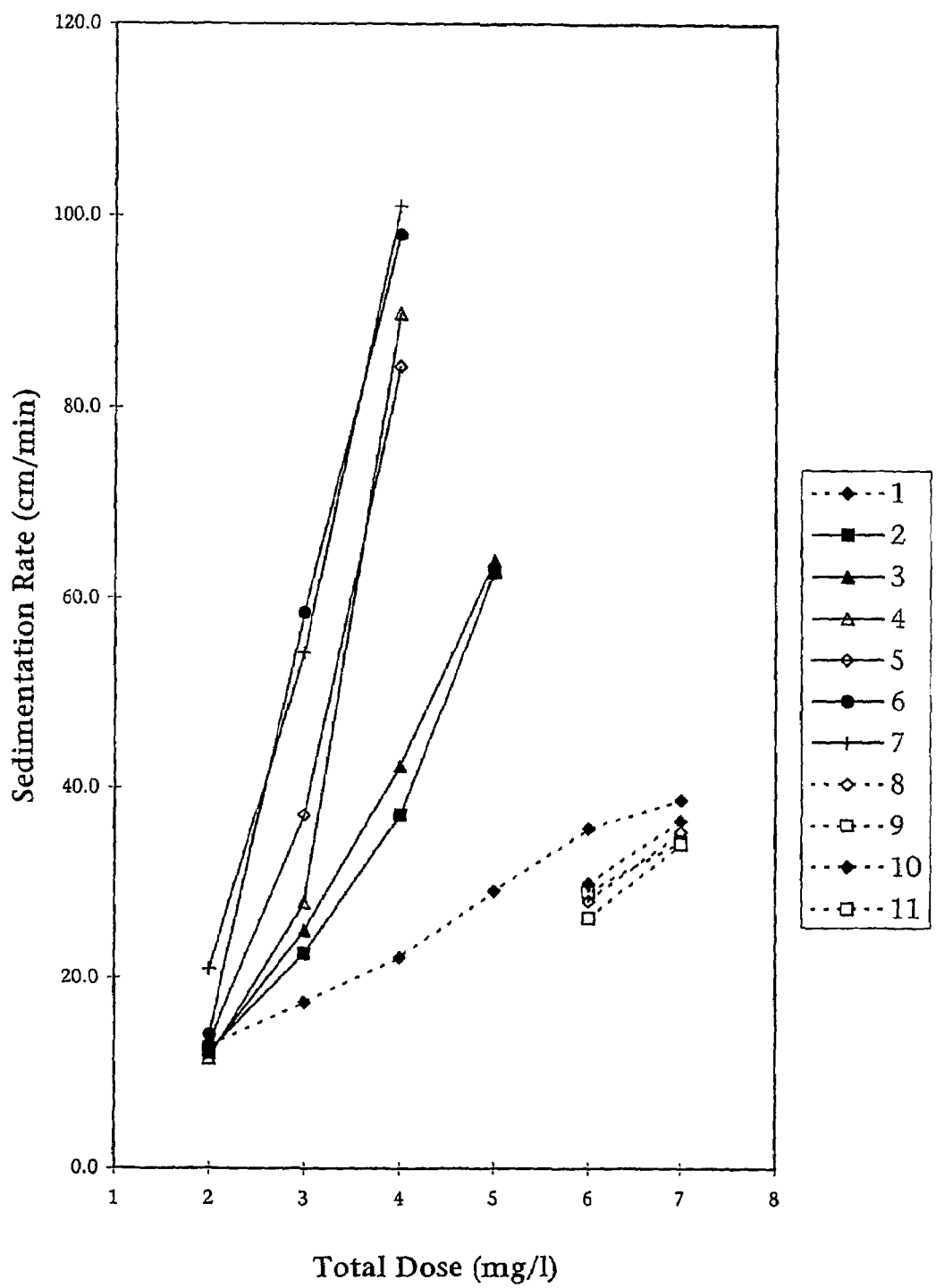

The results are plotted in FIG. 3. It can clearly be seen that the treatments employing a first non-ionic polymer followed by a second anionic polymer give improved dose efficiency over second non-ionic or cationic polymers. It can also be seen that particularly improved results are found when using second anionic polymers of at least 30 weight % anionic units.

EXAMPLE 4

Example 1 is repeated except using the following treatments:
Test 1 Polymer A followed by Polymer C (50/50)
Test 2 First addition of 50/50 (wt./wt.) mixture of Polymer A and Polymer C then second addition of 50/50 (wt./wt/) mixture of Polymer A and Polymer C
Test 3 Single addition of 50/50 (wt//wt.) mixture of Polymer A and Polymer C
Polymer A and Polymer C are as defined previously.
The sedimentation rates in cm/min are shown in table 4

TABLE 4

| Dose mg/l | Test 1 | Test 2 | Test 3 |
|---|---|---|---|
| 2.0 | 7.0 | | |
| 2.5 | 21.6 | | |
| 3.0 | 103.4 | 5.4 | |
| 4.0 | 124.5 | 12.1 | 8.7 |
| 5.0 | | 16.3 | 14.7 |
| 6.0 | | 50.0 | 21.4 |

Figure 4:
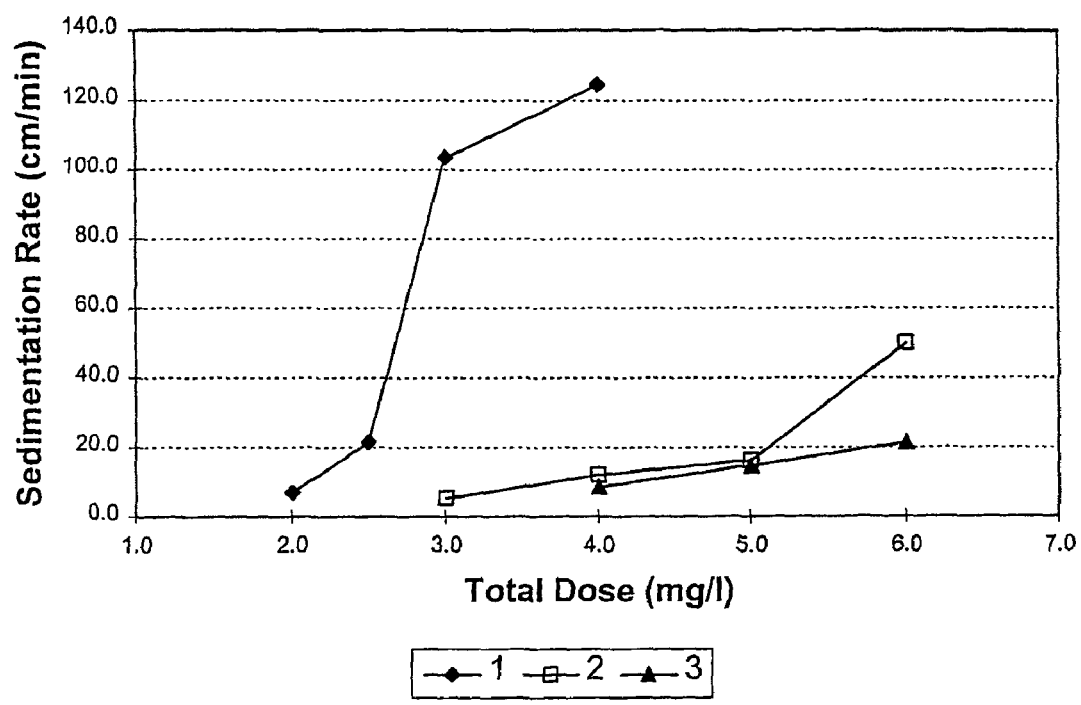

The results are plotted in FIG. 4.

The importance of using separate doses of non-ionic and anionic polymers, in which the non-ionic polymer is allowed to mix with the suspension before addition of the anionic polymer can clearly be seen.

What is claimed is:

1. A method of dewatering an aqueous mineral suspension comprising
    introducing into the suspension a flocculating system comprising,
    a) a substantially non-ionic synthetic polymeric flocculant having a molecular weight of at least 500,000 and selected from the group consisting of polymers of acrylamide, polyvinyl pyrrolidone, and polyethylene oxide, and
    b) an anionic synthetic polymeric flocculant having a molecular weight of at least 500,000 and selected from copolymers comprising acrylamide with monomers selected from (meth)acrylic acid or 2-acrylamido-2-methyl propane sulphonic acid and salts thereof,
    wherein,
    the substantially non-ionic polymeric flocculant is added to the suspension before the addition of the anionic polymeric flocculant,
    wherein the non-ionic flocculant is between 25 and about 50 wt. % based on the total weight of flocculant,
    allowing the suspension to flocculate and
    dewatering the suspension by sedimentation.

2. A method according to claim 1 in which the substantially non-ionic polymer comprises no more than 10 mole % ionic repeating units.

3. A method according to claim 1 in which the substantially non-ionic polymer is wholly non-ionic or comprises no more than 2 mole % anionic repeating units.

4. A method according to claim 1 in which the non-ionic polymer is selected from the group consisting of polymers of acrylamide, and polyethylene oxide.

5. A method according to claim 1 in which the anionic polymer comprises up to 50 mole % anionic repeating units.

6. A method according to claim 1 in which the anionic polymer is selected from copolymers comprising acrylamide with monomers selected from (meth)acrylic acid and salts thereof.

7. A method according to claim 1 in which the mineral suspension is selected from China clay suspensions, suspensions of swelling clays, calcium carbonate suspensions, titanium dioxide suspensions, suspensions of coal tailings, red mud and phosphate shines.

* * * * *